(12) United States Patent
Yokoyama

(10) Patent No.: US 9,057,429 B2
(45) Date of Patent: Jun. 16, 2015

(54) CONCENTRIC MULTI-AXIS ACTUATOR

(75) Inventor: Akihiro Yokoyama, Nagano (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 113 days.

(21) Appl. No.: 14/113,015

(22) PCT Filed: May 16, 2011

(86) PCT No.: PCT/JP2011/002718
§ 371 (c)(1),
(2), (4) Date: Oct. 21, 2013

(87) PCT Pub. No.: WO2012/157020
PCT Pub. Date: Nov. 22, 2012

(65) Prior Publication Data
US 2014/0033840 A1 Feb. 6, 2014

(51) Int. Cl.
*F16H 49/00* (2006.01)
*F16C 19/36* (2006.01)
*F16C 19/55* (2006.01)
*H02K 7/08* (2006.01)

(52) U.S. Cl.
CPC ........... *F16H 49/001* (2013.01); *Y10T 74/1836* (2015.01); *F16C 19/362* (2013.01); *F16C 19/55* (2013.01); *H02K 7/083* (2013.01)

(58) Field of Classification Search
CPC .............................. F16H 49/001; B25J 9/1025
See application file for complete search history.

(56) References Cited

U.S. PATENT DOCUMENTS

| 4,425,822 | A | * | 1/1984 | Marschner et al. ............. 74/640 |
| 4,716,785 | A | * | 1/1988 | Godai et al. .................... 74/640 |
| 5,222,409 | A | * | 6/1993 | Dalakian ..................... 74/479.01 |
| 5,720,590 | A | * | 2/1998 | Hofmeister ................. 414/744.2 |
| 5,816,117 | A | * | 10/1998 | Berry et al. ...................... 74/640 |
| 6,485,250 | B2 | * | 11/2002 | Hofmeister ................. 414/744.1 |
| 7,752,939 | B2 | * | 7/2010 | Ono ........................... 74/490.03 |
| 8,443,694 | B2 | * | 5/2013 | Ihrke .............................. 384/461 |
| 2004/0081379 | A1 | | 4/2004 | Shirasawa |

(Continued)

FOREIGN PATENT DOCUMENTS

JP S63-7285 A 1/1988
JP H01-153287 A 6/1989

(Continued)

OTHER PUBLICATIONS

International Search Report for PCT/JP2011/002718, Aug. 9, 2011.

*Primary Examiner* — William Kelleher
*Assistant Examiner* — Terence Boes

(57) ABSTRACT

A concentric double axis actuator has a two-stage cross roller bearing, and a preceding-stage actuator and a subsequent-stage actuator which are linked in tandem. The front end of a subsequent stage rotary output shaft of the subsequent actuator, said subsequent stage rotary output shaft passing through a hollow section of the preceding-stage actuator and projecting forward, is linked and fixed to an inner ring of the two-stage cross roller bearing, and the inner ring functions as a subsequent-stage rotary output member. The output rotary side of the preceding-stage actuator is linked to an middle ring of the two-stage cross roller bearing, which functions as a preceding-stage rotary output member. The rotary output element of each stage is supported by the two-stage cross roller bearing, and surface oscillations of the rotary output member of each stage can be minimized, and the moment stiffness of the members can be increased.

8 Claims, 3 Drawing Sheets

(56) References Cited

U.S. PATENT DOCUMENTS

2009/0249918 A1* 10/2009 Koyama ............ 74/665 F
2011/0245006 A1* 10/2011 Negishi ............ 74/490.01

FOREIGN PATENT DOCUMENTS

| | | |
|---|---|---|
| JP | H03-281183 A | 12/1991 |
| JP | H05-4178 A | 1/1993 |
| JP | H05-329785 A | 12/1993 |
| JP | H06-791 A | 1/1994 |
| JP | 2703291 B2 | 1/1998 |
| JP | 2750771 B2 | 5/1998 |
| WO | 03/050428 A1 | 6/2003 |

* cited by examiner

CONCENTRIC MULTI-AXIS ACTUATOR

TECHNICAL FIELD

The present invention relates to a concentric multi-axis actuator, by which it is possible for the output rotation of a plurality of actuators arrayed in tandem to be output from the same side, and in particular relates to a concentric multi-axis actuator provided with sufficient moment stiffness, from which rotary output may be extracted without surface oscillations (axial oscillations) from the actuators.

Industrial robots, for example, transport robots used to transport workpieces such as substrates, employ concentric multi-axis actuators as rotary driving mechanisms. For example, in a concentric two-axis actuator, two actuators are linked in tandem, the actuator at the preceding stage side being of hollow design, and the rotary output shaft of the actuator at the subsequent stage side being passed through the hollow section of the preceding stage-side actuator, and projecting frontward from the hollow output shaft of the preceding stage-side actuator. Components such as robot arms fixed through linkages to the concentric rotary output shaft and hollow output shaft respectively can be driven separately. Concentric multi-axis actuators having such a configuration are disclosed in Patent Documents 1 to 8. A multi-stage cross roller bearing relating to the present invention is disclosed in Patent Document 9.

PRIOR ART DOCUMENTS

Patent Documents

[Patent Document 1] JP-A 63-7285, FIG. 6
[Patent Document 2] JP-B 2750771, FIG. 2
[Patent Document 3] JP-A 6-791
[Patent Document 4] JP-A 5-329785
[Patent Document 5] JP-A 5-4178
[Patent Document 6] JP-B 2703291
[Patent Document 7] U.S. Pat. No. 6,485,250
[Patent Document 8] U.S. Pat. No. 5,720,590
[Patent Document 9] WO 2003/050428 pamphlet

SUMMARY OF THE INVENTION

Problems to be Solved by the Invention

In a concentric multi-axis actuator, because the rotary output shaft of the subsequent stage-side actuator passes through the hollow section of the preceding stage-side actuator and projects to the front side thereof, the subsequent stage-side rotary output shaft has longer axial length. With a longer axial length, the concentricity of the rotary output shaft is lower, and axial oscillations (surface oscillations) are greater. Moreover, moment stiffness is also lower for a rotary output shaft of greater length. When a bearing or the like is added to support a rotary output shaft in order to minimize axial oscillation and increase the moment stiffness, it is necessary in some cases to make the axial length of the rotary output shaft even longer, in order to ensure space for installation of the additional components.

With the foregoing in view, an object of the present invention is to propose a concentric multi-axis actuator able to prevent or minimized axial oscillations, and moreover having high moment stiffness.

Means to Solve the Problems

In order to solve the aforementioned problems, according the concentric multi-axis actuator of the present invention is characterized by having:

a multi-stage cross roller bearing; a preceding-stage actuator arranged coaxially to a rear side of the multi-stage cross bearing; and a subsequent-stage actuator arranged coaxially to a rear side of the preceding-stage actuator;

the preceding-stage actuator being provided with a preceding-stage hollow section extending through the center thereof in the axial direction;

the subsequent-stage actuator being provided with a subsequent-stage rotary output shaft extending forward through the preceding-stage hollow section;

the multi-stage cross roller bearing being provided with an outer ring, a middle ring arranged concentrically to the inside of the outer ring, an inner ring arranged concentrically to the inside of the middle ring, an annular outside track of rectangular cross section formed between the outer ring and the middle ring, a plurality of outside rollers rollably inserted within the outside track, an annular inside track of rectangular cross section formed between the middle ring and the inner ring, and a plurality of inside rollers rollably inserted within the inside track;

the middle ring constituting a preceding-stage rotary output member rotationally driven by the preceding-stage actuator; and the inside ring constituting a subsequent-stage rotary output member securely linked to the subsequent-stage rotary output shaft.

Where the subsequent-stage actuator has a hollow design, a hollow section is formed extending through the center of the concentric multi-axis actuator, and therefore the hollow section can be utilized as space for wiring or the like. Moreover, a concentric three-axis actuator can be realized by further linking an actuator to the rear side of the subsequent-stage actuator, and causing the rotary output shaft of this actuator to project forward via the hollow section. Likewise, a concentric two-axis actuator of hollow design can be employed as two preceding-side stage actuator sections in a concentric multi-axis actuator.

An actuator comprising a motor and a strain wave gear reducer can be employed as the preceding-stage actuator or the subsequent-stage actuator. In this case, the strain wave gear reducer is preferably a strain wave gear reducer of a "silk hat" design, suited to ensuring a large hollow section.

In this case, the concentric multi-axis actuator of the present invention can be constituted as follows. Specifically, the preceding-stage actuator is provided with a preceding-stage motor and a preceding-stage strain wave gear reducer; the preceding-stage strain wave gear reducer being provided with a preceding-stage reducer housing, a preceding-stage rigid internal gear fixed coaxially to the inside of the preceding-stage reducer housing, a preceding-stage flexible external gear of silk hat shape arranged coaxially to the inside of the preceding-stage rigid internal gear, and a preceding-stage wave generator fitted in to the inside of the preceding-stage flexible external gear; a center passage hole being formed in the preceding-stage wave generator; the preceding-stage housing being fixed to the outer ring; the preceding-stage flexible external gear being fixed to the middle ring; and the preceding-stage wave generator being fixed to a hollow motor shaft of the preceding-stage motor, which extends through the center passage hole of the preceding-stage wave generator.

Moreover, the subsequent-stage actuator is provided with a subsequent-stage motor and a subsequent-stage strain wave gear reducer; the subsequent-stage strain wave gear reducer being provided with a subsequent-stage reducer housing, a subsequent-stage rigid internal gear fixed coaxially to the inside of the subsequent-stage reducer housing, a subsequent-stage flexible external gear of silk hat shape arranged coaxially to the inside of the subsequent-stage rigid internal gear, and a subsequent-stage wave generator fitted in to the inside of the subsequent-stage flexible external gear; a center passage hole being formed in the subsequent-stage wave generator; the subsequent-stage housing being fixed to a motor housing of the preceding-stage motor; the subsequent-stage flexible external gear being fixed to the rear end of the subsequent-stage rotary output shaft; and the subsequent-stage wave generator being fixed to a motor shaft of the subsequent-stage motor, which extends through the center passage hole of the subsequent-stage wave generator.

The multi-stage cross roller bearing used in the present invention is characterized in that the inside rollers are smaller than the outside rollers, and the center of the inside rollers is positioned at an offset along the axial direction, with respect to the center of the outside rollers.

The amount of this offset preferably is one-half of the track width of the inside track to one-half the sum of the value of this track width and the track width of the outer track. Furthermore, the amount of offset is preferably one-half of the track width of the outside track.

The thickness of the middle ring in a radial direction from the circular inside peripheral face to the circular outside peripheral face is preferably at least twice the thickness of the outer ring in a radial direction from the circular inside peripheral face to the circular outside peripheral face.

Furthermore, the outside track and the inside track are preferably formed in the outer ring, the middle ring, and the inner ring, at positions close to one of the side surfaces thereof.

Next, a concentric three-axis actuator in which the present invention is applied employs a three-stage cross roller bearing in which an outer ring, a first middle ring, a second middle ring, and an inner ring are concentrically arranged. In this case, in the concentric multi-axis actuator of the present invention, a middle-stage actuator is arranged coaxially between the preceding-stage actuator and the subsequent-stage actuator. The middle-stage actuator is provided with a middle-stage hollow section extending in the axial direction through the center thereof, and a middle-stage rotary output shaft of hollow design extending forward through the middle-stage hollow section. The subsequent-stage stage rotary output shaft of the subsequent-stage actuator extends forward through the middle-stage hollow section, the middle-stage rotary output shaft, and the preceding-stage hollow section. The multi-stage cross roller bearing is moreover provided, as the middle rings, with a first middle ring, and a second middle ring arranged concentrically to the inside thereof, a middle track of annular shape of rectangular cross section being formed between the first middle ring and the second middle ring, and a plurality of middle rollers being rollably inserted within the inside track. The first middle ring constitutes a preceding-stage rotary output member rotationally driven by the preceding-stage actuator, and the second middle ring constitutes a middle-stage rotary output member securely linked to the middle-stage rotary output shaft.

Effect of the Invention

In the concentric multi-axis actuator according to the present invention, the multi-stage cross roller bearing, the preceding-stage actuator, and the subsequent-stage actuator are linked in tandem; and the front end of the subsequent-stage rotary output shaft of the subsequent-stage actuator, the shaft projecting forward through the hollow section of the preceding-stage actuator, is securely linked to the inner ring of the multi-stage cross roller bearing, with the inner ring functioning as the subsequent-stage rotary output member. The preceding-stage actuator is linked at the rotary output side to the middle ring of the multi-stage cross roller bearing, the middle ring functioning as the preceding-stage rotary output member. Because the rotary output elements of each stage are supported by the multi-stage cross roller bearing, surface oscillation of the rotary output members of the stages can be minimized, and the moment stiffness thereof can be increased.

MODE FOR CARRYING OUT THE INVENTION

Figure 1:
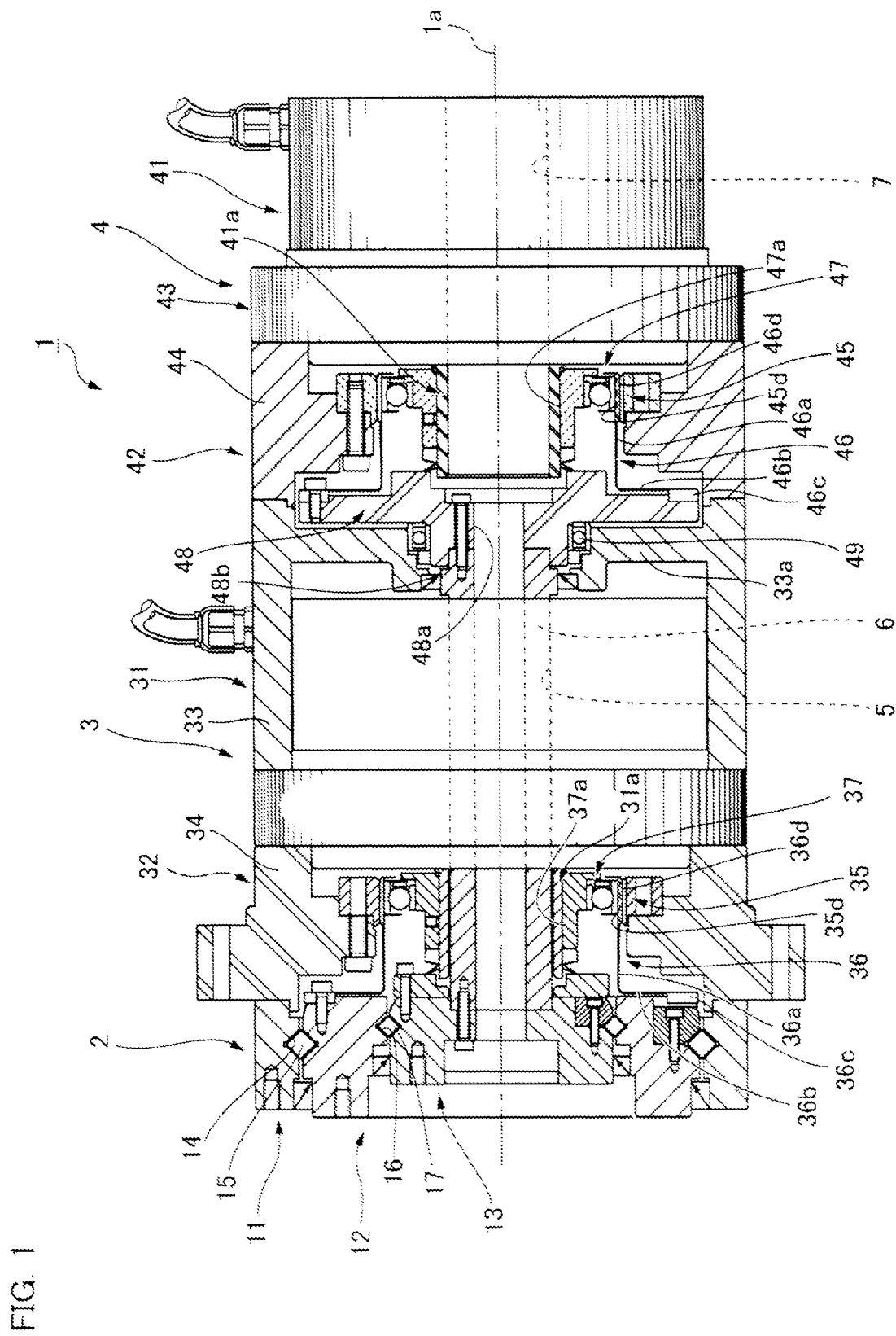
FIG. 1 is a longitudinal sectional view of a concentric two-axis actuator to which the present invention is applied.

Embodiments of concentric multi-axis actuators to which the present invention is applied are described below with reference to the drawings.

A concentric two-axis actuator according to an embodiment of the present invention will be described with reference to FIG. 1. A concentric two-axis actuator 1 has, along the axis 1a thereof, a two-stage cross roller bearing 2 serving as the multi-stage cross roller bearing arranged at the front end, a preceding-stage actuator 3 coaxially linked to the rear side of the cross roller bearing, and a subsequent-stage actuator 4 coaxially linked to the rear side of the preceding-stage actuator. The preceding-stage actuator 3 is provided with a preceding-stage hollow section 5 of circular cross section extending through the center thereof in the direction of the axis 1a, and the subsequent-stage actuator 4 is provided with a subsequent-stage rotary output shaft 6 of hollow design extending forward coaxially through the preceding-stage hollow section 5. The subsequent-stage actuator 4 of the present example is provided with a subsequent-stage hollow section 7 of circular cross section extending through the center thereof in the direction of the axis 1a.

The two-stage cross roller bearing 2 positioned at the front end of the concentric two-axis actuator 1 is provided with an outer ring 11, a middle ring 12 positioned concentrically to the inside thereof, and an inner ring 13 positioned concentrically to the inside thereof. An outside track 14 of annular shape of rectangular cross section is formed between the outer ring 11 and the middle ring 12, where a plurality of outside rollers 15 are rollably inserted, with their center axes in an alternately orthogonal state. Likewise, an inside track 16 of annular shape of rectangular cross section is formed between the middle ring 12 and the inner ring 13, where a plurality of inside rollers 17 are rollably inserted, with their center axes in an alternately orthogonal state. Consequently, an outside cross roller bearing is constituted by the outer ring 11, the middle ring 12, the outside track 14, and the outside rollers 15; and an inside cross roller bearing is constituted by the middle ring 12, the inner ring 13, the inside track 16, and the inside rollers 17.

The middle ring 12 of the two-stage cross roller bearing functions as a preceding-stage rotary output member rotationally driven by the preceding-stage actuator 3, while the inner ring 13 functions as a subsequent-stage rotary output member rotationally driven by the subsequent-stage rotary output shaft 6. A hollow section extending in the direction of the axis 1a is formed through the concentric two-axis actuator 1 by a center through hole of the inner ring 13, the hollow section of the subsequent-stage rotary output shaft 6, and the subsequent-stage hollow section 7.

Next, the structure of each part is described in more specific terms. The preceding-stage actuator 3 is provided with a preceding-stage motor 31, and a preceding-stage strain wave gear reducer 32 for transmitting the output rotation of this preceding-stage motor 31 to the middle ring 12. The preceding-stage strain wave gear reducer 32 is provided with a preceding-stage reducer housing 34 of cylindrical shape linked to the front end side of a motor housing 33 of the preceding-stage actuator 3, and a preceding-stage rigid internal gear 35 is fastened and fixed coaxially at a region to the inner peripheral side thereof. A preceding-stage flexible external gear 36 of silk hat shape is arranged coaxially to the inside thereof, and a preceding-stage wave generator 37 is fitted in coaxially to the inside thereof.

The preceding-stage flexible external gear 36 is provided with a circular cylindrical barrel section 36a capable of flexing in a diametrical direction, a diaphragm 36b spreading outward in a radial direction from the end of this circular cylindrical barrel section 36a at the two-stage cross roller bearing 2 side thereof, and a rigid annular boss 36c formed at the outside peripheral edge thereof. External teeth 36d are formed in the outside peripheral surface part of the open end at the opposite side of the circular cylindrical barrel section 36a, and the preceding-stage wave generator 37 of ellipsoidal contour is fitted into the inside of the circular cylindrical barrel section 36a on which the external teeth 36d are formed, whereby the external teeth 36d positioned at both ends on the major axial direction of the external teeth formation part which has been deformed to ellipsoidal shape mesh with internal teeth 35d of the preceding-stage rigid internal gear 35.

The outer ring 11 of the two-stage cross roller bearing 2 is fastened and fixed to the front end face of the preceding-stage reducer housing 34. The annular boss 36c of the preceding-stage flexible external gear 36 is fastened and fixed to the annular front end face of the middle ring 12 of the two-stage cross roller bearing 2. The preceding-stage wave generator 37 is provided with a center through hole 37a, and a hollow motor shaft 31a of the preceding-stage motor 31 extends forward and passes therethrough. The preceding-stage wave generator 37 is fastened and fixed to the outside periphery of this hollow motor shaft 31a. Consequently, the meshing position of the two gears 35, 36 is moved in the circumferential direction by the preceding-stage wave generator 37 which is caused to rotate at high speed by the hollow motor shaft 31a of the preceding-stage motor 31, whereby relative rotation is generated between the two gears 35, 36, due to the difference in the number of teeth between the two gears. Because the preceding-stage rigid internal gear 35 is fixed so as to not rotate, rotation of greatly reduced speed is extracted from the preceding-stage flexible external gear 36, and is output to the middle ring 12 linked thereto.

The subsequent-stage actuator 4 is provided with a subsequent-stage motor 41, as well as a subsequent-stage strain wave gear reducer 42 for transmitting reduced-speed output rotation of the subsequent-stage motor 41 to the inner ring 13 via the subsequent-stage rotary output shaft 6. The subsequent-stage strain wave gear reducer 42 is provided with a subsequent-stage reducer housing 44 of cylindrical shape which forms the part at the front end side of a motor housing 43 of the subsequent-stage actuator 4, and a subsequent-stage rigid internal gear 45 is fastened and fixed coaxially at a region to the inside peripheral side thereof. A subsequent-stage flexible external gear 46 of silk hat shape is arranged coaxially to the inside of the rigid internal gear, and a subsequent-stage wave generator 47 is fitted in coaxially to the inside of the flexible external gear.

The subsequent-stage flexible external gear 46 is identical in configuration to that of the preceding-stage flexible external gear 36, being provided with a circular cylindrical barrel section 46a capable of flexing in a diametrical direction, a diaphragm 46b spreading outward in a radial direction from the end of this circular cylindrical barrel section 46a at the preceding-stage actuator 3 side thereof, and a rigid annular boss 46c formed at the outside peripheral edge thereof. External teeth 46d are formed in the outside peripheral surface part of the open end at the opposite side of the circular cylindrical barrel section 46a, and the subsequent-stage wave generator 47 of ellipsoidal contour is fitted into the inside of the circular cylindrical barrel section 46a on which the external teeth 46d are formed, whereby the external teeth 46d positioned at both end of the major axial direction of the external teeth formation part which has deformed into an ellipsoidal shape mesh with internal teeth 45d of the subsequent-stage rigid internal gear 45.

The front end face of the subsequent-stage reducer housing 44 is fastened and fixed to the rear end face of a cylindrical housing 33 of the subsequent-stage actuator 3. A linking disk 48 provided with a center through hole 48a is arranged to the inside of these fastened and fixed parts. An annular flange 48b that projects forward is formed in a part nearer to the center side of the linking disk 48, and the rear end section of the subsequent-stage rotary output shaft 6, which protrudes rearward from a center through hole of a rear-side end plate part 33a of the cylindrical housing 33 of the subsequent-stage actuator 3, is fastened and fixed to this front end part. The linking disk 48 is rotatably supported by the rear-side end plate part 33a of the cylindrical housing 33, by means of a ball bearing 49. Furthermore, the annular boss 46c of the subsequent-stage flexible external gear 46 is fastened and fixed to the end face at the rear end side of the linking disk 48.

Next, the subsequent-stage wave generator 47 is provided with a center through hole 47a, and a hollow motor shaft 41a of the subsequent-stage motor 41 extends forward and passes therethrough. The subsequent-stage wave generator 47 is fastened and fixed to the outside periphery of this hollow motor shaft 41a. Consequently, the meshing position of the two gears 45, 46 is moved in the circumferential direction by the subsequent-stage wave generator 47 which is rotated at high speed by the hollow motor shaft 41a of the preceding-stage motor 41, whereby relative rotation is generated between the two gears 45, 46, due to the difference in the number of teeth between the two gears. Because the subsequent-stage rigid internal gear 45 is fixed so as to not rotate, rotational output of greatly reduced speed is extracted from the subsequent-stage flexible external gear 46, and is outputted from the inner ring 13 of the two-stage cross roller bearing 2, via the linking disk 48 and the subsequent-stage rotary output shaft 6 which are linked thereto.

A problem encountered in multi-stage cross roller bearings of construction in which cross roller bearings are arranged concentrically in multiple stages is that precompressive deformation arising in the middle ring, which functions as the inner ring of the outside cross roller bearing and as the outer ring of the inside cross roller bearing, makes it difficult to ensure smooth rotation of the inside and outside cross roller bearings. However, this problem can be solved by configuring the two-stage cross roller bearing 2 of the present example as described below.

Figure 2:
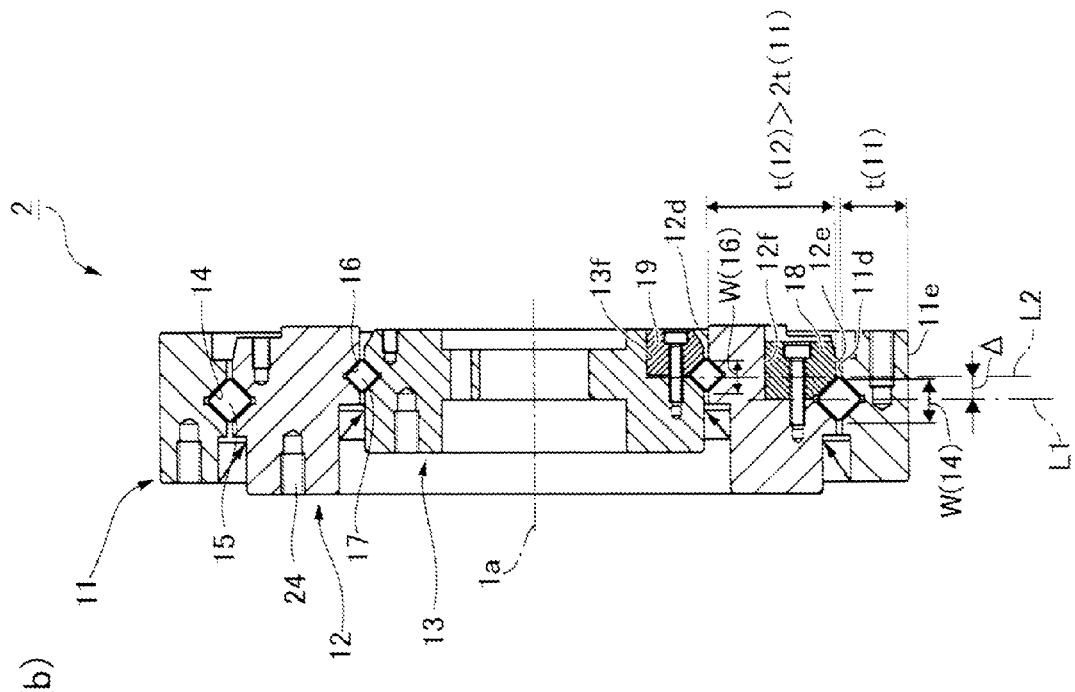
FIG. 2 is an end view and a longitudinal sectional view showing the two-stage cross roller bearing of FIG. 1.
Figure 2:
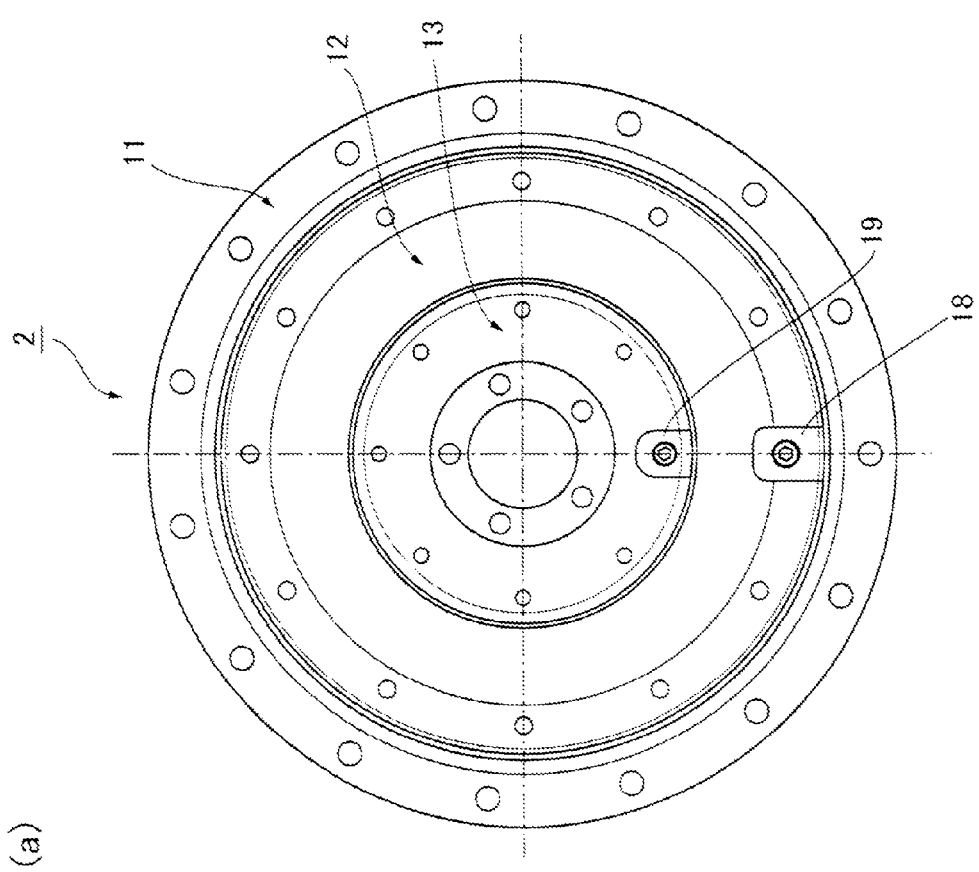

Reference is made to FIG. 2 in the following description. In the two-stage cross roller bearing 2, the rollers in the inside cross roller bearing part, specifically, the inside rollers 17, are smaller than the rollers in the outside cross roller bearing part, specifically, the outside rollers 15. The roller center L2 of the inside rollers 17 is positioned at an offset along the axis 1a, with respect to the roller center L1 of the outside rollers 15.

Thus, in the two-stage cross roller bearing 2, due to the smaller roller size of the small-diameter inside cross roller bearing part, and to the larger roller size of the large-diameter outside cross roller bearing part, when the two-stage cross roller bearing 2 is in the assembled state, precompressive strain acting on the middle ring 12 from the inside and the outside can be equalized. Moreover, because the roller center L1 of the outside cross roller bearing and the roller center L2 of the inside cross roller bearing are positioned at an offset in direction of the axis 1a thereof, precompressive deformation arising in the middle ring 12 can be reduced, as compared to the case in which these parts are positioned in the same plane in the radial direction. As a result, precompressive deformation of the middle ring when the two-stage cross roller bearing 2 is in the assembled state can be minimized, and smooth rotation of the respective cross roller bearing parts can be assured.

Here, the amount of offset Δ of the roller center L2 of the inside rollers 17 with respect to the roller center L1 of the outside rollers 15 is preferably a value within a range of from one-half of the track width W(16) of the inside track 16, to one-half the sum of the value of the track width W(16) in question and the track width W(14) of the outside track 14. When the amount of offset is less than a value in this range, precompressive deformation of the middle ring cannot be minimized to a sufficient extent, and therefore smooth rotation of the cross roller bearings cannot be assured. Increasing the amount of offset to a level greater than a value in this range affords no further improvement in terms of the effect of minimizing precompressive deformation due to the offset, and the width dimension of the two-stage cross roller bearing in the direction of the center axis becomes larger, which is undesirable for the purposes of flattening the shape of the cross roller bearing parts.

$$W(16)/2 < \Delta < \{W(16)+W(14)\}/2$$

According to the present example, in order to flatten the shape of the two-stage cross roller bearing 2 while effectively minimizing precompressive deformation of the middle ring 12, the amount of offset Δ is one-half the track width W(14) of the outside track 14, and the roller axis L2 is positioned closer towards the annular end face 12a side with respect to the roller center L1.

Moreover, in the present example, in order to reliably prevent precompressive deformation of the middle ring 12, the thickness t(12) of the middle ring 12 in the radial direction from the circular inside peripheral face 12d to the circular outside peripheral face 12e thereof is set to at least twice the thickness t(11) of the outer ring 11 from the circular inside peripheral face 11d to the circular outside peripheral face 11e thereof.

Furthermore, in the present example, the annular end faces of the outer ring 11, the middle ring 12, and the inner ring 13 are positioned on substantially identical planes, with the outside track 14 being on the side close to the inside end faces of the outer ring 11 and the middle ring 12, and the inside track 16 likewise being on the side close to the inside end faces of the middle ring 12 and the inner ring 13. Insertion apertures 12f, 13f into which the rollers are to be inserted are formed in the inside end faces of the middle ring 12 and the inner ring 13, and are sealed by stoppers 18, 19. The outside track 14 and the inside track 16 are thus shifted towards the side close to the end face on the roller insertion side, in the direction of the bearing center axis 1a. Consequently, the ease of assembly of the two-stage cross roller bearing 2 can be improved.

(Additional Embodiments)

While the aforedescribed example pertains to application of the present invention to a concentric two-axis actuator, the present invention can be likewise be applied to a concentric multi-axis actuator in which actuators are linked in tandem in three or more stages, and output the rotation of each stage from the same side. For example, in the case of a concentric three-axis actuator as shown in FIG. 3, a three-stage cross roller bearing is arranged at the front end, and to the rear side thereof are coaxially linked a preceding-stage actuator, a middle stage actuator, and a subsequent-stage actuator.

Figure 3:
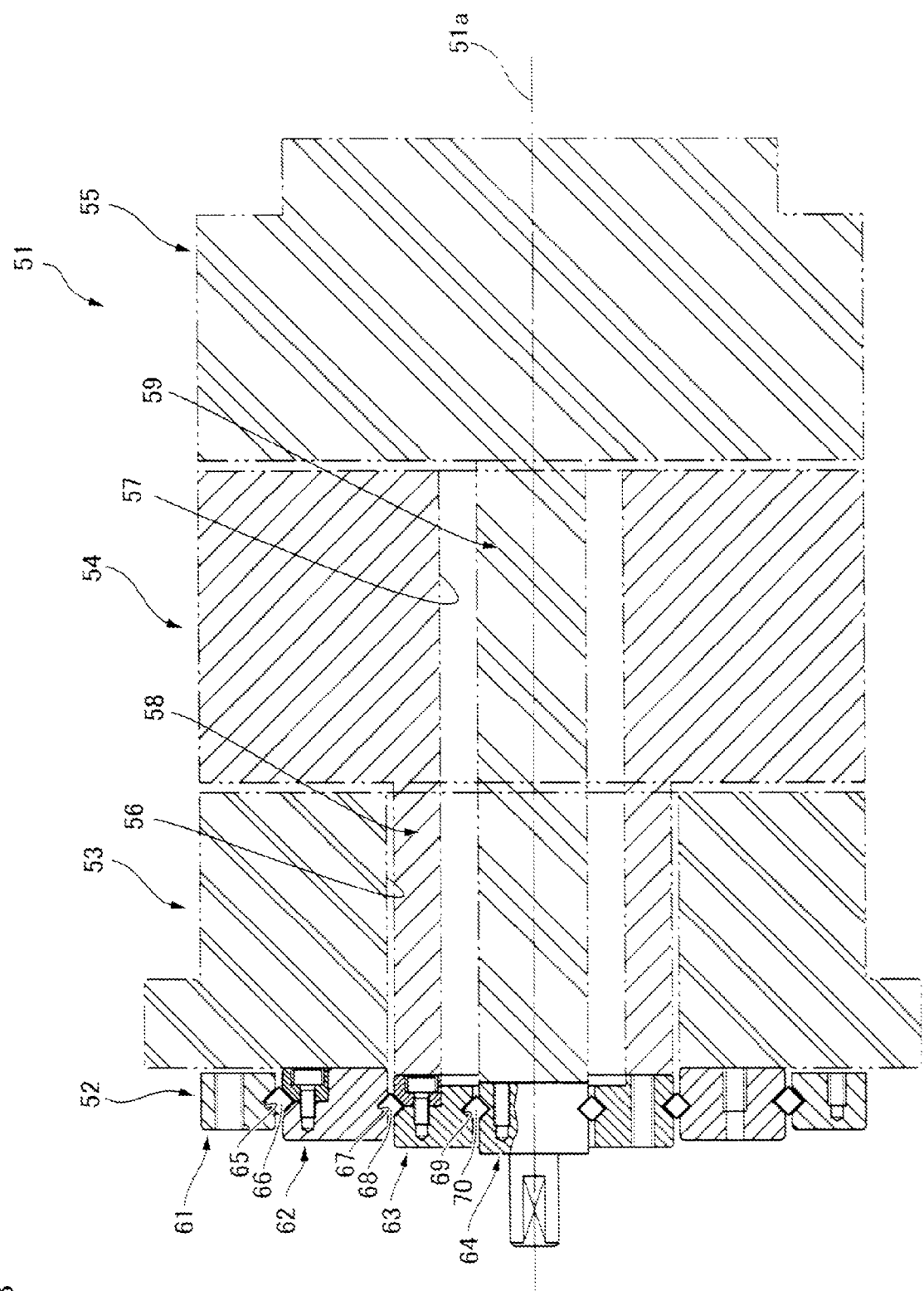
FIG. 3 is a descriptive diagram showing a concentric three-axis actuator to which the present invention is applied.

Reference is made to FIG. 3 in the following description. The concentric three-axis actuator 51 has a three-stage cross roller bearing 52, a preceding-stage actuator 53 arranged coaxially to the rear side of the three-stage cross roller bearing 52, a middle-stage actuator 54 arranged coaxially to the rear side of the preceding-stage actuator 53, and a subsequent-stage actuator 55 arranged coaxially to the rear side of the middle-stage actuator 54. The preceding-stage actuator 53 is provided with a preceding-stage hollow section 56 extending to pass through the center thereof in the direction of an axis 51a. The middle-stage actuator 54 is likewise provided with a middle-stage hollow section 57 extending to pass through the center thereof in the direction of the axis 51a, and a middle-stage rotary output shaft 58 of hollow design extends forward to pass through the preceding-stage hollow section 56. The subsequent-stage actuator 55 is provided with a subsequent-stage rotary output shaft 59, and the subsequent-stage rotary output shaft 59 extends forward to pass through the middle-stage hollow section 57 and the hollow section of the middle-stage rotary output shaft 58.

The three-stage cross roller bearing 52 is provided with an outer ring 61, a first middle ring 62 arranged concentrically to the inside thereof, a second middle ring 63 arranged concentrically to the inside thereof, and an inner ring 64 arranged concentrically to the inside thereof. Additionally, between the outer ring 61 and the first middle ring 62 there is formed an annular outside track 65 of rectangular cross section, and a plurality of outside rollers 66 are rollably inserted within the outside track 65, with their center axes in an alternatingly orthogonal state. An annular middle track 67 of rectangular cross section is formed between the first and second middle rings 62, 63, and a plurality of middle rollers 68 are rollably inserted therein, with their center axes in an alternately orthogonal state. Likewise, an annular inside track 69 of rectangular cross section is formed between the second middle ring 63 and the inner ring 64, and a plurality of inside rollers 70 are rollably inserted therein, with their center axes in an alternatingly orthogonal state.

The first middle ring 62 is a preceding-stage rotary output member rotationally driven by the preceding-stage actuator 53, the second middle ring 63 is a middle-stage rotary output member securely linked to the middle-stage rotary output shaft 58, and the inner ring 64 is a subsequent-stage rotary output member securely linked to the subsequent-stage rotary output shaft 59.

As the preceding-stage actuator 53, one comparable in configuration to the preceding-stage actuator 3 of FIG. 1 can be employed; and as the middle-stage actuator 54, one comparable in configuration to the subsequent-stage actuator 4 of FIG. 1 can be employed. As the subsequent-stage actuator 55, there can be employed one configured like the subsequent-stage actuator 4 of FIG. 1, but with the motor shaft 41a being a solid shaft, omitting the subsequent-stage hollow section 7.

It is also possible for the subsequent-stage actuator 55 to be of a hollow design comparable to the subsequent-stage actuator 4 of FIG. 1, and for the subsequent-stage rotary output shaft 59 to be a hollow shaft. A hollow section that passes through the center of the concentric three-axis actuator 51 can thereby be formed, which allows this section to be utilized as a wire routing part or the like.

The invention claimed is:

1. A concentric multi-axis actuator (1) comprising:
a multi-stage cross roller bearing (2), a preceding-stage actuator (3) arranged coaxially to a rear side of the multi-stage cross bearing (2), and a subsequent-stage actuator (4) arranged coaxially to a rear side of the preceding-stage actuator (3), wherein
the preceding-stage actuator (3) has a preceding-stage hollow section (5) extending through a center thereof along a direction of an axis (1a);
the subsequent-stage actuator (4) has a subsequent-stage rotary output shaft (6) extending forward through the preceding-stage hollow section (5);
the multi-stage cross roller bearing (2) has an outer ring (11), a middle ring (12) arranged concentrically to an inside of the outer ring, an inner ring (13) arranged concentrically to an inside of the middle ring, an annular outside track (14) of rectangular cross section formed between the outer ring (11) and the middle ring (12), a plurality of outside rollers (15) rollably inserted within the outside track (14), an annular inside track (16) of rectangular cross section formed between the middle ring (12) and the inner ring (13), and a plurality of inside rollers (17) rollably inserted within the inside track (16);
the middle ring (12) is a preceding-stage rotary output member rotationally driven by the preceding-stage actuator (3); and
the inner ring (13) is a subsequent-stage rotary output member fixed to the subsequent-stage rotary output shaft (6), and
wherein the preceding-stage actuator (3) has a preceding-stage motor (31) and a preceding-stage strain wave gear reducer (32);
the preceding-stage strain wave gear reducer (32) has a preceding-stage reducer housing (34), a preceding-stage rigid internal gear (35) fixed coaxially to an inside of the preceding-stage reducer housing, a preceding-stage flexible external gear (36) of silk hat shape arranged coaxially to an inside of the preceding-stage rigid internal gear, a preceding-stage wave generator (37) fitted in an inside of the preceding-stage flexible external gear, and a center through hole (37a) formed in the preceding-stage wave generator (37);
the preceding-stage reducer housing (34) is fixed to the outer ring (11), the preceding-stage flexible external gear (36) is fixed to the middle ring (12), and the preceding-stage wave generator (37) is fixed to a hollow motor shaft (31a) of the preceding-stage motor (31), the hollow motor shaft extending through the center through hole (37a) of the preceding-stage wave generator;
the subsequent-stage actuator (4) has a subsequent-stage motor (41) and a subsequent-stage strain wave gear reducer (42);
the subsequent-stage strain wave gear reducer (42) has a subsequent-stage reducer housing (44), a subsequent-stage rigid internal gear (45) fixed coaxially to an inside of the subsequent-stage reducer housing, a subsequent-stage flexible external gear (46) of silk hat shape arranged coaxially to an inside of the subsequent-stage rigid internal gear, a subsequent-stage wave generator (47) fitted in an inside of the subsequent-stage flexible external gear, and a center through hole (47a) formed in the subsequent-stage wave generator (47);
the subsequent-stage housing (44) is fixed to a motor housing (43) of the preceding-stage motor (31), the subsequent-stage flexible external gear (46) is fixed to an rear end of the subsequent-stage rotary output shaft (6); and
the subsequent-stage wave generator (47) is fixed to a motor shaft (41a) of the subsequent-stage motor (41), the motor shaft extending through the center through hole (47a) of the subsequent-stage wave generator.

2. The concentric multi-stage actuator (1) according to claim 1, wherein a roller size of the inside rollers (17) are smaller than a roller size of the outside rollers (15), and a roller center (L2) of the inside rollers (17) is positioned at an offset along the direction of the axis (1a), with respect to a roller center (L1) of the outside rollers (15).

3. The concentric multi-stage actuator (1) according to claim 2, wherein an offset amount ($\Delta$) of the roller center (L2) of the inside rollers (17) with respect to the roller center (L1) of the outside roller (15) is in a range of one-half of a track width of the inside track (16) to one-half the sum of a value of this track width and a track width of the outside track (14).

4. The concentric multi-stage actuator (1) according to claim 2, wherein the offset amount ($\Delta$) is one-half of the track width of the outside track (14).

5. The concentric multi-stage actuator (1) according to claim 2, wherein a thickness of the middle ring (12) in a radial direction from a circular inside peripheral face to a circular outside peripheral face thereof is at least twice a thickness of the outer ring (11) in a radial direction from a circular inside peripheral face to a circular outside peripheral face thereof.

6. The concentric multi-stage actuator (1) according to any one of claims 2 to 5, wherein the outside track (14) and the inside track (16) are formed in the outer ring (11), the middle ring (12), and the inner ring (13), at positions closer to one side surfaces thereof than the other side surfaces thereof, and roller insertion holes (12f, 13f) are formed in the one side surfaces of the middle ring (12) and the inner ring (13), and are sealed with stoppers (18, 19).

7. The concentric multi-axis actuator according to any one of claims 1 to 5, wherein the subsequent-stage actuator (4) has a subsequent-stage hollow section (7) extending through a center thereof, the subsequent-stage rotary output shaft (6) is a hollow shaft, and the inner ring (13) is formed with a center through hole, and the subsequent-stage hollow part (7), the hollow part of the subsequent-stage rotary output shaft (6) and the center through hole of the inner ring (13) constitute a hollow part extending to pass through along the direction of the axis (1a).

8. The concentric multi-axis actuator according to claim 6, wherein the subsequent-stage actuator (4) has a subsequent-stage hollow section (7) extending through a center thereof, the subsequent-stage rotary output shaft (6) is a hollow shaft, and the inner ring (13) is formed with a center through hole, and the subsequent-stage hollow part (7), the hollow part of the subsequent-stage rotary output shaft (6) and the center through hole of the inner ring (13) constitute a hollow part extending to pass through along the direction of the axis (1a).

* * * * *